United States Patent
Roundtree

(10) Patent No.: US 6,640,098 B1
(45) Date of Patent: Oct. 28, 2003

(54) SYSTEM FOR OBTAINING SERVICE-RELATED INFORMATION FOR LOCAL INTERACTIVE WIRELESS DEVICES

(75) Inventor: Brian C. Roundtree, Kirkland, WA (US)

(73) Assignee: Action Engine Corporation, Redmond, WA (US)

( * ) Notice: Subject to any disclaimer, the term of this patent is extended or adjusted under 35 U.S.C. 154(b) by 311 days.

(21) Appl. No.: 09/658,407

(22) Filed: Sep. 8, 2000

Related U.S. Application Data

(60) Provisional application No. 60/182,330, filed on Feb. 14, 2000.

(51) Int. Cl.[7] .............................. H04B 7/00; H04Q 7/20
(52) U.S. Cl. ................................ 455/414.2; 455/456.5; 455/41.2
(58) Field of Search ................................ 455/456, 457, 455/414, 422, 461, 426, 456.5, 414.2, 41.2; 342/450, 457, 463, 464; 701/207, 208

(56) References Cited

U.S. PATENT DOCUMENTS

| | | | | |
|---|---|---|---|---|
| 5,774,803 A | * | 6/1998 | Kariya | 455/414 |
| 5,930,699 A | * | 7/1999 | Bhatia | 455/456.3 |
| 6,091,956 A | * | 7/2000 | Hollenberg | 455/456.5 |
| 6,108,554 A | * | 8/2000 | Kawamoto | 455/456 |
| 6,256,498 B1 | * | 7/2001 | Ludwig | 455/456.6 |
| 6,259,405 B1 | * | 7/2001 | Stewart et al. | 342/457 |
| 6,356,761 B1 | * | 3/2002 | Huttunen et al. | 455/456 |
| 6,389,337 B1 | * | 5/2002 | Kolls | 701/29 |

FOREIGN PATENT DOCUMENTS

| | | | | |
|---|---|---|---|---|
| WO | WO 93/01665 | * | 1/1993 | H04B/7/26 |
| WO | WO 94/11853 | * | 5/1994 | G08B/25/01 |
| WO | WO 98/19479 | * | 5/1998 | H04Q/7/22 |
| WO | WO 99/45732 | * | 9/1999 | H04Q/7/38 |

* cited by examiner

*Primary Examiner*—Duc Nguyen
(74) *Attorney, Agent, or Firm*—Schwabe, Williamson & Wyatt, PC

(57) ABSTRACT

Detecting local interactive wireless devices and an indication of services provided by or associated with them. A user's wireless device sends a ping signal based upon user input, a command from a server, or a command from another wireless device. The ping signal is used for short range wireless communication with other wireless devices. The other wireless devices within range receive the ping signal and transmit back a response. The user's wireless device assembles the responses into a structured format and can use them to display an identification of the wireless devices within the range or other information such as an indication of services of the wireless devices or services of entities associated with them. It can also transmit the responses to the server in order to obtain additional information about services within the range.

18 Claims, 8 Drawing Sheets

SYSTEM FOR OBTAINING SERVICE-RELATED INFORMATION FOR LOCAL INTERACTIVE WIRELESS DEVICES

REFERENCE TO RELATED APPLICATIONS

This application claims the benefit of priority of U.S. provisional patent application No. 60/182,330 filed Feb. 14, 2000 and entitled "Web-Based Personal Assistant Communication System and Method Therefor", and is related to the following applications, all of which are incorporated herein by reference as if fully set forth:

| U.S. application No. | Filed | Entitled |
|---|---|---|
| 09/615,660 | Jul. 14, 2000 | Web-Based Personal Assistant Communication Method |
| 09/616,468 | Jul. 14, 2000 | Web-Based Personal Assistant Communication System |
| 09/616,490 | Jul. 14, 2000 | Web-Based Personal Assistant User Interface System |
| 09/658,399 | Sep. 8, 2000 | System for Secure Electronic Transactions Using Unique Identifiers for Order-Related Information |
| 09/658,406 | Sep. 8, 2000 | System for Converting Textual Concepts to Interactive Audio and Audio/Visual Presentations |
| 09/658,467 | Sep. 8, 2000 | Voice-to-Concept Conversion System |
| 09/658,468 | Sep. 8, 2000 | On-Line Service Provider Sign-Up System |

FIELD OF THE INVENTION

The present invention relates to an apparatus and method for communicating with local interactive wireless devices in order to obtain information concerning services associated with or provided by the wireless devices.

BACKGROUND OF THE INVENTION

Wireless devices, such as cell phones and personal digital assistants (PDAs), are becoming more commonly used and have the potential for communication over the Internet in addition to traditional telephone networks. The Internet communication with these devices permits users to obtain services and other related information using wireless communication with the devices. For example, a user can download content from the world wide web on the Internet using a cell phone and have the information displayed on the display panel of the cell phone. Therefore, in addition to using the cell phone for voice communication, the user can obtain content over the Internet concerning, for example, services available from service providers. The user can also execute transactions over the Internet using the cell phone or other wireless device. For example, the user can make electronic purchases for good or services, analogous to how users can make transactions over the Internet using a personal computer having a connection to the Internet.

Many wireless devices, however, provide for limited ways to enter information for communications over the Internet. Cell phones, for example, typically have only a key pad in addition to a microphone, making entry of textual information slow and inconvenient. Other devices, such as PDAs, may have even more limited ways to enter textual information. Therefore, these devices do not typically provide the same ease of interacting over the Internet as provided by a personal computer having a keyboard and cursor-control device for easy and convenient "point and click" selection of content displayed in web pages.

Wireline devices, such as conventional phones, provide for even more limited interaction over the Internet. In particular, they typically do not have a display panel as present, for example, on cell phones. Therefore, these wireline devices usually only provide for voice interaction and communication, possibly involving phone calls over both traditional phone networks and the Internet.

Also, use of Internet communication with the wireless devices does not always provide a way to communicate with many types of service providers. For example, certain service providers do not have an Internet presence for receiving an order for services and must receive it in other ways such as through fax or voice (phone) communication. Therefore, even with Internet access by the wireless devices, they do not have access to many types of service providers who otherwise may provide services to the users.

In addition, technology and protocols exists for communication directly between wireless devices, which further enhances the functions they can perform. With this communication, a wireless device can obtain an indication of other local wireless devices within a particular short range of it. However, the information received is typically only a network identifier for the other devices. Therefore, the wireless device has no indication of services available from those wireless devices or from service providers associated with them.

Finally, security is often an issue with any Internet transaction. A user making a transaction to purchase goods or services must typically provide information identifying his or her name and address, as well as credit card information. Certain technology does exist for transmitting the information with encryption to help prevent interception of the actual information. Even with encryption, however, the service provider obtains the identity of the user making the purchase and the user's credit card number. Therefore, the user's identity and credit card information is potentially known by many different service providers and present in many different databases as maintained by the service providers. Increased distribution of such information can increase a likelihood of misuse of the information.

Accordingly, a need exists for increased options and versatility for user's having wireless devices or wireline devices to interact and make transactions over the Internet, for the ability to contact and make transactions with more types of service providers, for obtaining more information concerning local services, and for providing more secure transactions.

SUMMARY OF THE INVENTION

An apparatus and method consistent with the present invention provide for detecting local interactive wireless devices and an indication of services associated with them. A ping signal is sent from a user wireless device and, the wireless device receives responses to the ping signal from other wireless devices within a particular range of the user wireless device. The ping signal is a wireless signal transmitted to local interactive wireless devices in order to obtain a response from them. The responses are assembled into a structured format and used to determine a particular interaction with the user wireless device such as services available with the particular range.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Introduction

Figure 1:
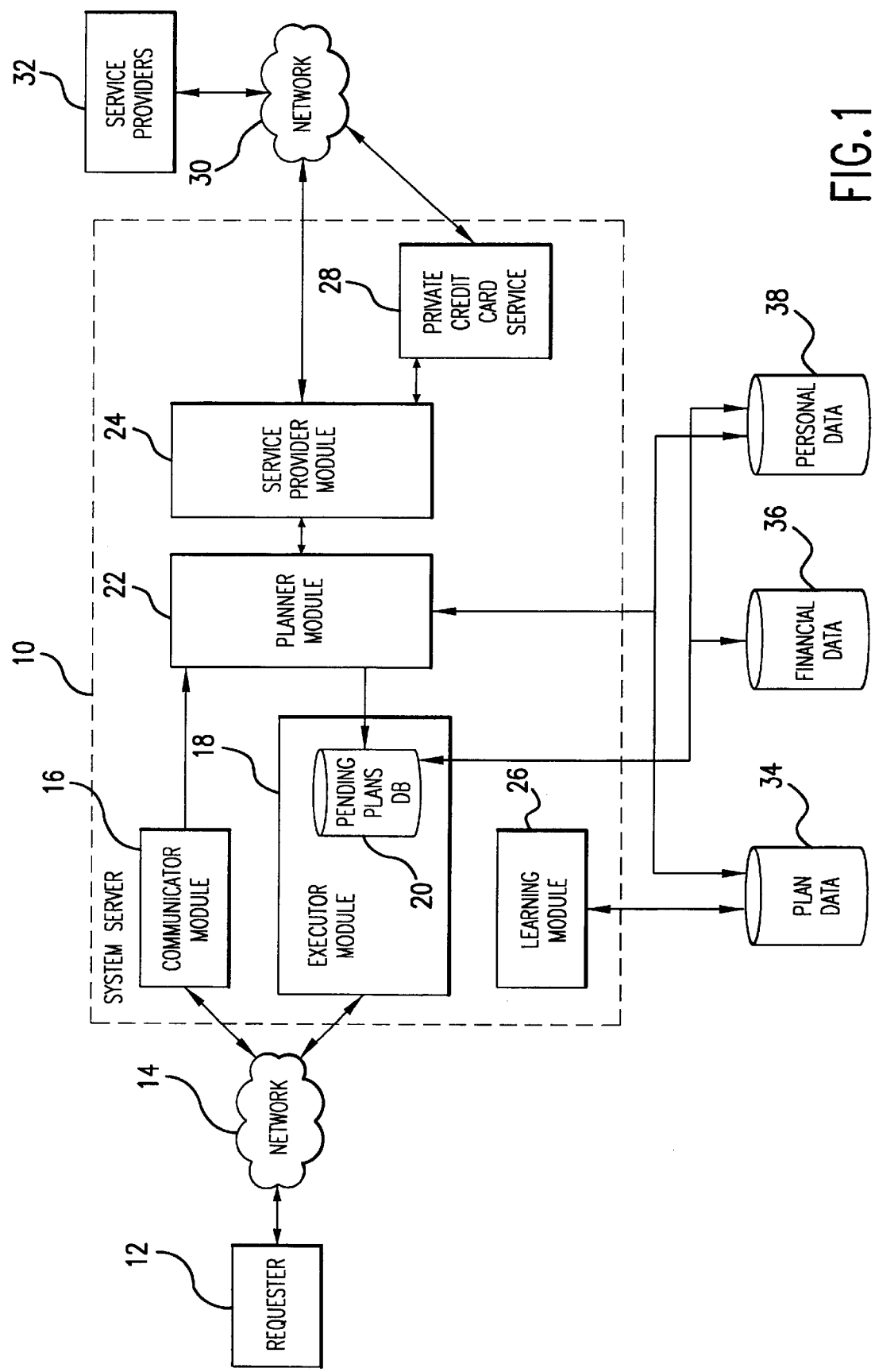
FIG. 1 is a diagram of a system for processing requests for service.

Embodiments consistent with the present invention provide various features for a web-based electronic personal assistant, as described in the web-based personal assistance applications identified above. The electronic personal assistant is implemented with a system server that the receives requests from users through wireless or wireline devices and processes the requests in order to provide the user with requested service or information. These features permit the user to interact with the system server in a variety of ways such as through a display on the device, a keyboard or keypad, or through voice interaction. The system server can present information to the user in a variety of ways as well, such as through audio communication or through information presented on a display with, for example, textual information, screens, or web pages presented with Hyper-Text Markup Language (HTML).

The requests, as explained in the web-based personal assistance applications identified above, can include any request for service or information. For example, a user may request a meeting, and in response the system server queries the user to obtain information required to arrange the meeting and then automatically makes the arrangements. As another example, a user may request information concerning services in a particular geographic location or based upon other parameters, and the system server can query the user to determine the type of information requested, such as particular types of retail establishments, and provide the information to the user. As another example, a user may request to purchase goods or services, or make reservations for services, and in response the system server queries the user to determine the type of goods or services desired as well as other information such as a desired price. Based upon that information, the system server automatically makes the purchase for the user. For the reservations example, the system server can query the user to determine information required to make the reservations for the user. For any request, the system server can access user preferences to obtain information required or useful to process the request, such as the user's credit card information and shipping address.

In addition, the system server can automatically notify the user of particular information. The system server typically maintains a database of preferences for the users in order to help process the requests. It also maintains a concept database and uses the concepts in order to retrieve and construct queries, such as text fragments, for the user. The use of only text fragments, for example, saves transmission time in comparison to transmission of graphical information over a network; alternatively, graphics can be used in addition to the text fragments.

Based upon the type of request, and potentially user preferences, the system server selects the appropriate queries from the concept database to obtain information to process the request. Upon completion of the processing, the system server can present to the user a sentence constructed from the related concepts in order to confirm the request. It can also use the sentence to document the request, retrieve the appropriate resources for it, and otherwise fulfill the request. This process, and the use of these concepts and the structure for a concept database, are further described in the web-based personal assistance applications identified above.

The system server can also cross-reference the concept database with a service provider database. In order to fulfill requests, the system server can access a database identifying available service providers for the request. At the end of each string of concepts in the concept database, that database can specify a link or pointer to the relevant service providers in the service provider database. For example, if the request is for a meeting, once the system server has all the relevant information as constructed from the concepts, the concept for the location of the meeting can include a pointer or link to the establishments proximate the location and available to provide food for the meeting. Therefore, information for relevant service providers can be associated with the appropriate concepts in the concept database.

Request Processing

FIG. 1 is a diagram of a system for fulfilling a request for service. The system includes a system server 10 for processing a request transmitted from a requester 12 through a network 14 such as the Internet or other wireline or wireless network. System server 10 includes several software modules for processing the request from requestor 12. A communicator module 16 manages an interface for the communications with requestor 12 over network 14. Communicator module 16 receives the request and provides necessary formatting and other processing for transmitting it to a planner module 22.

Planner module 22 interacts with a service provider module 24 in order to obtain the resources for fulfilling the request. In particular, service provider module 24 interacts over a network 30, such as the Internet or a phone network, with one or more service providers 32 in order to obtain services to fulfill the request. Service provider module 24 provides for communication and data conversion for the interaction, while planner module 22 manages processing of the request and interacts with various databases for processing the request. A private credit card service module 28 can provide for secure order processing of the request to help safeguard users' personal information such as credit card numbers.

Once the planner module 22 has obtained the resources for the request, it communicates information to fulfill the request to an executor module 18. Executor module 18 includes a pending plan database 20 for storing and managing resources and other information to fulfill the request. Executor module 18 thus communicates back over network 14 with requestor 12 to provide confirmation of the request and also to execute the request.

A learning module 26 can provide for fine-tuning plan data within a database 34 in order to more efficiently process requests, particularly from the same requester. Other databases include a database 36 storing financial data accessed by executor module 18, and a database 38 storing personal data accessed by executor module 18 and planner module 22. The personal data can include an account for each user having a profile and preferences for the users, and the information can be indexed by a particular user identifier such as a phone number or code.

Table 1 illustrates a user account. As shown, the user accounts can include users' preferences for a wide variety of information such as for travel, dining, and other types of service providers. The user preferences can be continually updated and refined over time as the system server gathers more information concerning the user, and the system server can optionally use learning models for the refinements and use the preferences to make "smart choices" in processing users' requests. The information can be stored in a variety of ways such as in a relational database or with name-value pairs in Extensible Markup Language (XML).

TABLE 1

| | |
|---|---|
| user 1 identifier | data |
| contact | name, address |
| profile | user 1 characteristics |
| hotel information | user 1 hotel preferences |
| airline information | user 1 airline preferences |
| rental car information | user 1 rental car preferences |
| restaurant information | user 1 restaurant preferences |
| service provider preferences | user 1 service provider preferences |
| other category | user 1 preferences for the category |

Processing to fulfill the request is further explained in the web-based personal assistance applications identified above.

Network

Figure 2:
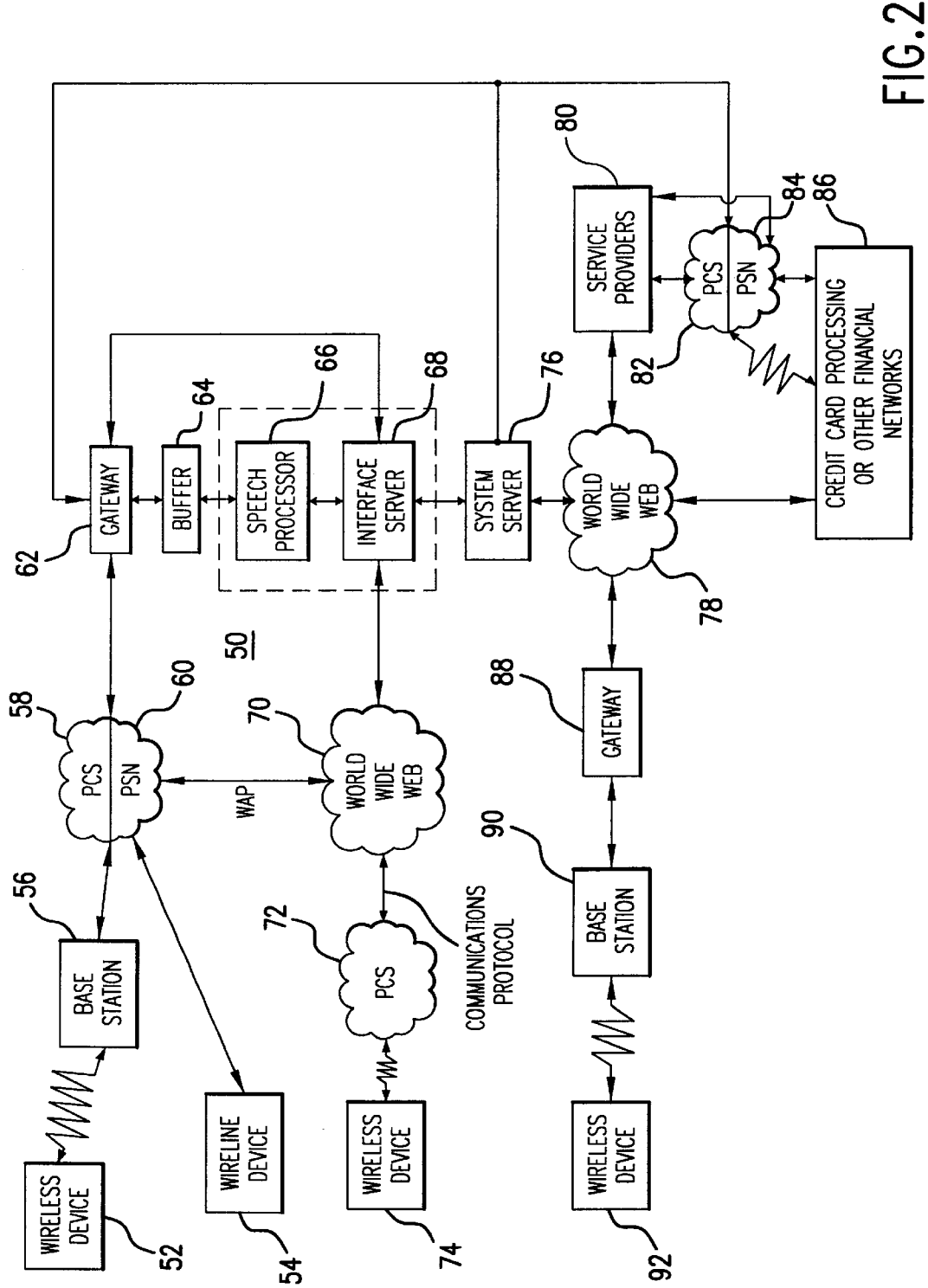
FIG. 2 is a diagram of a network for communicating with wireless and wireline devices and service providers to process requests for service.

FIG. 2 is a diagram of an exemplary network 50 illustrating interaction for receiving and processing requests from users such as requester 12. It illustrates how the system can receive requests through wireless and wireline transmission over conventional phone and cellular networks as well as the Internet or other computer networks. A requestor typically makes a request from a wireless or wireline device. The wireless devices include any device capable of wireless electronic communication and examples include the following: cellular phones; PDAs with wireless network access; wireless Internet appliances; personal computers (including desktop, laptop, notebook, and others) with wireless network access; and personal computers with microphones, speakers, and circuitry for permitting wireless phone calls. The wireline devices include any device capable of electronic wireline communication and examples include the following: conventional phones; PDAs with wireline network access; Internet appliances; personal computers (including desktop, laptop, notebook, and others) with wireline network access; and personal computers with microphones, speakers, and circuitry for permitting wireline phone calls.

A wireless device 52, for example, can interact through wireless transmission with a base station 56 for communication over a personal communication system (PCS) 58. A request may also be made from a wireline device 54 communicating over a public switched telephone network (PSN) 60. Systems for wireless and wireline communication, includes a PCS and PSN, are known in the art.

Communications through networks 58 and 60 are transmitted through a gateway 62 and potentially a buffer 64 to a speech processor 66 for performing processing of audio or particular types of communications, such as for voice-to-text conversion. Also, the communication may occur directly from gateway 62 to an interface server 68. Interface server 68 controls gateway 62, and it provides an interface between a system server 76 and gateway 62, speech processor 66, and the world wide web 70.

System server 76 corresponds with system server 10 in FIG. 1 to process user requests. Interface server 68 provides the data conversion and processing for transferring data to and from system server 76. As shown by the dashed line, speech processor 66 and interface server 68 can be implemented with the same physical machine or with different machines. Also, system server 76 can be implemented with one or more physical machines and can also be programmed to implement the functions of speech processor 66 and interface server 68.

In addition to receiving requests over networks 58 and 60, interface server 68 can receive a request over the world wide web 70. In particular, a wireless device 74 can interact through wireless communication with a PCS 72, which communicates over the world wide web 70 through a communication protocol such as, for example, the wireless application protocol (WAP). The WAP for communications over the Internet is known in the art.

System server 76 can communicate over the world wide web 78 with various service provides 80 to fulfill requests. In addition, system server 76 can communicate with credit card processing or other financial networks 86 in order to provide financial processing for fulfilling requests. Networks 86 can include known networks, including banking networks, for processing credit card transactions. As shown, service providers 80 and financial networks 86 can also send and receive communications through a PCS 82 and PSN 84.

System server 76 can communicate directly over the world wide web 78 to a gateway 88 and base station 90 in order to provide communication directly with a wireless device 92. Also as shown, communications can occur from system server 76 back through interface server 68 and speech processor 66 to the end user wireless devices 52 and 74 and wireline device 54; system server 76 can also communicate directly with gateway 62, as shown. Those communications can provide, for example, confirmation of a request or information responsive to a request.

Network 50 illustrates fundamental hardware components for communications over the various types of networks shown. As known in the art, network 50 can include additional components and can also include components for providing services known in the art with respect to phone calls. For example, it can include a caller ID service to provide system server 76 with the phone number of the user's wireless or wireline device originating a communication. Also, network 50 can include other means for communication of data such as through satellite transmission. For transmission over the Internet, network 50 can use Transmission Control Protocol/Internet Protocol (TCP/IP) or other protocols.

Server Components

Figure 3:
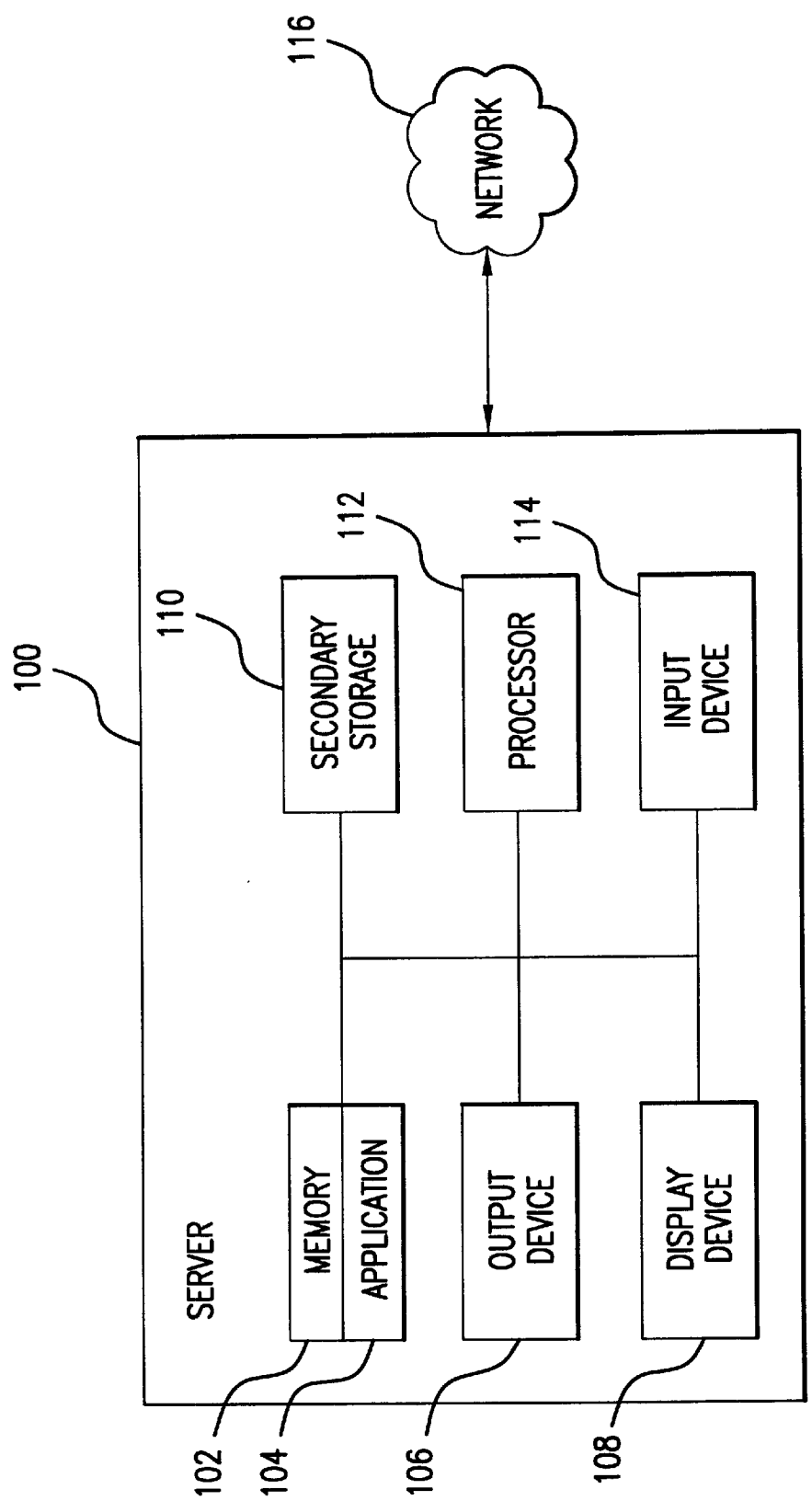
FIG. 3 is a diagram of exemplary components of a server for processing requests for service.

FIG. 3 depicts a server 100 illustrating exemplary hardware components of system server 10 and other machines used by the system, such as speech processor 66 and interface server 68. Server 100 includes a connection with a network 116 such as the Internet or other type of computer or phone networks, which may correspond with the networks shown in FIGS. 1 and 2. Server 100 typically includes a memory 102, a secondary storage device 110, a processor 112, an input device 114, a display device 108, and an output device 106.

Memory 102 may include random access memory (RAM) or similar types of memory, and it may store one or more applications 104 for execution by processor 112. Applications 104 may correspond with software modules to perform processing for the functions described below. Secondary storage device 110 may include a hard disk drive, floppy disk drive, CD-ROM drive, or other types of non-volatile data storage, and it may correspond with the various databases shown in FIG. 1. Processor 112 may execute applications or programs stored in memory 102 or secondary storage 110, or received from the Internet or other network 116. Input device 114 may include any device for entering information into server 100, such as a keyboard, key pad, cursor-control device, touch-screen (possibly with a stylus), or microphone. Display device 108 may include any type of device for presenting visual information such as, for example, a computer monitor, flat-screen display, or display panel. Output device 106 may include any type of device for presenting a hard copy of information, such as a printer, and other types of output devices include speakers or any device for providing information in audio form. Server 100 can possibly include multiple input devices, output devices, and display devices.

Although server 100 is depicted with various components, one skilled in the art will appreciate that this server can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling server 100 to perform a particular method.

Wireless Device Components

Figure 4:
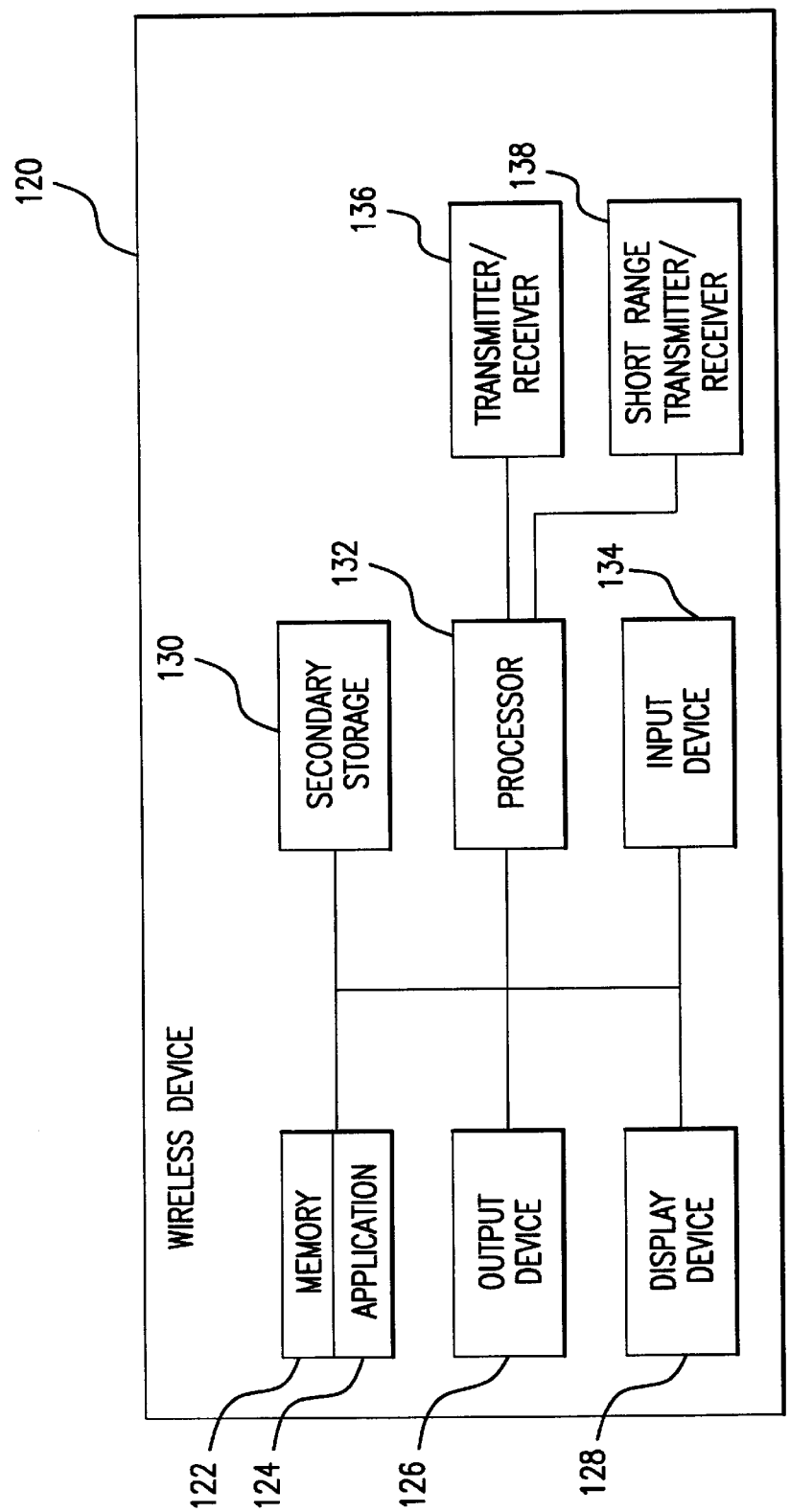
FIG. 4 is a diagram of exemplary components of a wireless device.

FIG. 4 illustrates exemplary hardware components of a wireless device 120, which may correspond with the exemplary wireless devices identified above. Wireless device 120 typically includes a memory 122, a secondary storage device 130, a processor 132, an input device 134, a display device 128, an output device 126, a transmitter/receiver 136, and a short range transmitter/receiver 138.

Memory 122 may include RAM or similar types of memory, and it may store one or more applications 124 for execution by processor 132. Applications 124 may correspond with software modules to perform processing for the functions described below, and they may also include web browser programs for retrieving and displaying content from the Internet. Secondary storage device 130 may include a hard disk drive, floppy disk drive, CD-ROM drive, or other types of non-volatile data storage such as a ROM. Processor 132 may execute applications or programs stored in memory 122 or secondary storage 130. Input device 134 may include any device for entering information into wireless device 120, such as a keyboard, key pad, cursor-control device, touch-screen (possibly with a stylus), or microphone. Wireless device 120 can include multiple input devices; for example, it can include both a microphone and key pad for a cell phone. Display device 128 may include any type of device for presenting visual information such as, for example, a computer monitor, flat-screen display, or display panel. Output device 126 typically includes a speaker for providing information in audio form. It can also include a device for providing a hard copy of information such as a printer, or provide a port for a connection to a printer. Wireless device 120 can possibly include multiple input devices, output devices, and display devices.

Transmitter/receiver 136 provides for wireless communication with phone networks or computer networks such as is shown in FIGS. 1 and 2. Transmitter/receiver 136 can be implemented with known RF transmitters and receivers for providing cellular transmission between wireless device 120 and base stations such as base stations 56 and 90, or it can be implemented with a wireless transmitter/receiver for other types of communication such as a satellite transmission.

Short range transmitter/receiver 138 provides for wireless short range communication with other wireless devices, and it can be implemented with transmitters and receivers that operate according to the IEEE standard 802.11 for local wireless networks or according to the standard referred to as the Bluetooth™ technology for direct wireless communication between local interactive wireless devices; that technology is explained in, for example, the Specification of the Bluetooth System, Core, v1.0 B, Dec. 1, 1999 and the Specification of the Bluetooth System, Profiles, v1.0 B, Dec. 1, 1999, both of which are incorporated herein by reference.

In addition, even if a wireless device does not contain short range transmitter/receiver 138, technology exists to obtain an approximate geographic location of certain wireless devices. In particular, using multiple base stations the signal from a cellular phone, for example, can be triangulated in order to obtain an approximate geographic location of the cellular phone, including an indication of its vertical (altitude) location.

Although wireless device 120 is depicted with various components, one skilled in the art will appreciate that this wireless device can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling wireless device 120 to perform a particular method.

Exemplary hardware components for wireline devices, such as the examples provided above, can include the same components as wireless device 120 except without the transmitter/receiver 136 and the short range transmitter/receiver 138.

Local Interactive Wireless Devices

Figure 5:
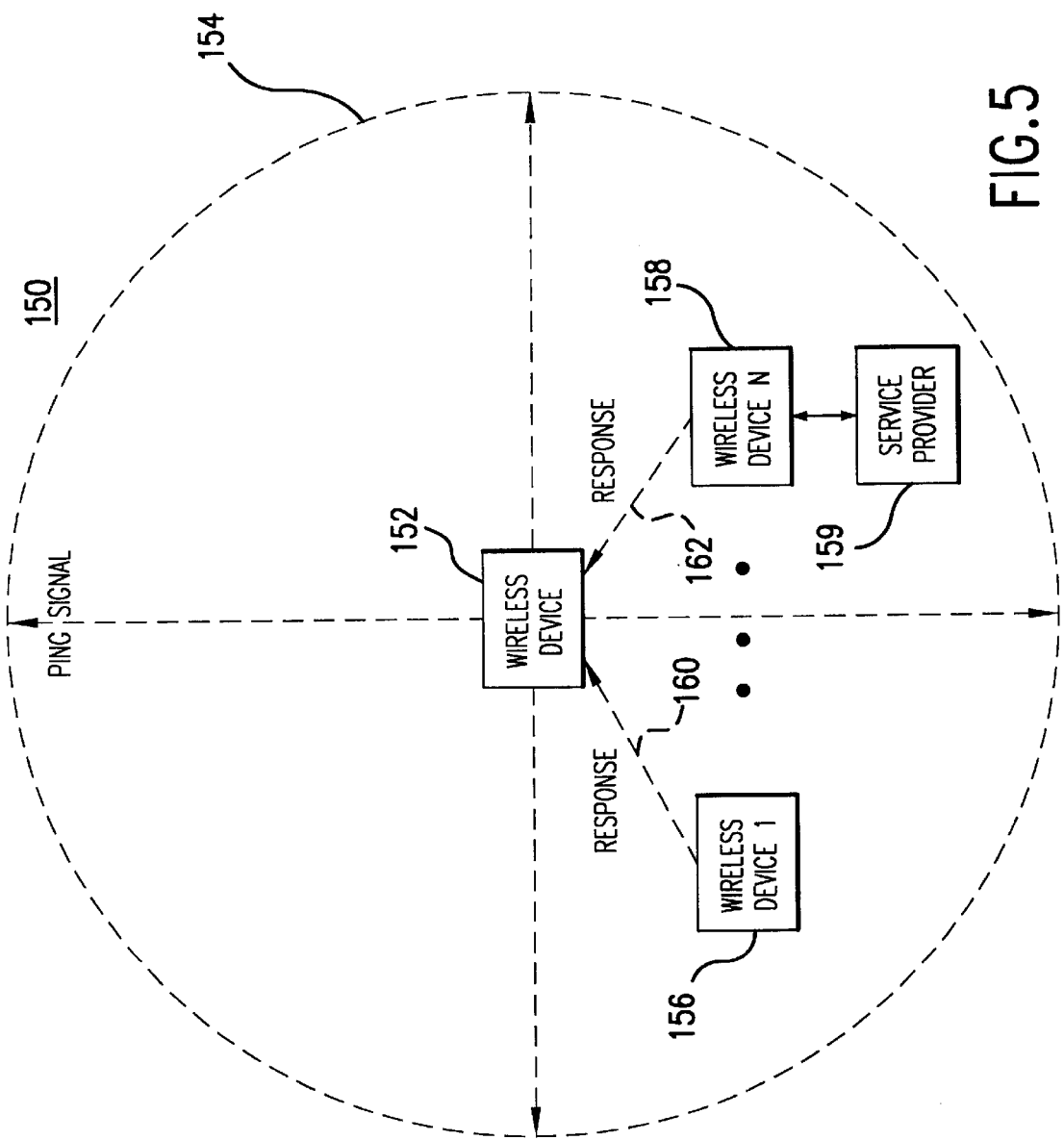
FIG. 5 is a diagram illustrating use of a ping signal by a wireless device to obtain information from other local wireless devices or associated service providers.

FIG. 5 is a diagram illustrating use of a ping signal to communicate with local interactive wireless devices. The local interactive wireless devices can be implemented with the exemplary wireless devices identified above and having short range transmitter/receiver 138. By including short range transmitter/receiver 138, many types of wireless devices can implement the ability to function as a local interactive wireless device according to the Bluetooth™ technology standard for local wireless communications, or according to other standards such as IEEE standard 802.11. The phrase "local interactive wireless device" refers to a device having the ability for local wireless communications.

Using the local wireless communication technology, a wireless device 152 can transmit a ping signal 154 local to wireless device 152 in a particular geographic region 150. A "ping signal" is any type of wireless signal transmitted from a first interactive wireless device in order to obtain information from other local interactive wireless devices within a particular range of the first device. The ping signal is typically a short range signal for communicating with local interactive wireless devices in a closer region than, for example, the range of a conventional cellular phone signal.

Local interactive wireless devices 156 and 158 within range received the ping signal and, in response, send responses 160 and 162 through a wireless transmission. With the local interactive wireless capability consistent with the Bluetooth™ standard, the devices can communicate directly with the user device sending the ping signal and need not necessarily send the signals through a network for processing and rebroadcasting. The response typically provides at least a network identifier for each wireless device 156 and 158 identifying its network location. The responses may also include additional information such as services available by the wireless devices or entities associated with them. Therefore, a local interactive wireless device, such as device 156, can provide information concerning its own capabilities, or the local interactive wireless device, such as device 158, can provide information concerning a service provider 159 associated with the device. For example, local interactive wireless device 158 can be located within a restaurant, coffee shop, gas station, retail store, business, or other establishment, and it can thus provide information concerning services provided by such entity.

Local interactive devices can provide context information concerning the services associated with them or can provide responses used to obtain context information. For example, if a particular local interactive device is within an automobile it can respond to a ping signal by providing a network address of the automobile. The server or another device in this example can then poll a global positioning system (GPS) in the automobile, using the received address to interact with it, in order to determine an approximate geographic location of the automobile and also determine that it is moving. Accordingly, in this example the context is that the user is in a moving automobile. Once a device or server obtains responses to a ping signal it can thus interact with the responding devices and associated systems to obtain context information.

Obtaining information concerning local interactive wireless devices, or associated service providers, can be used by system server 10 or other server to help fulfill and respond to a user's request as described above. For example, a user may request from system server 10 an identification of all restaurants local to it, and in response the system server 10 can instruct the user's device to send the ping signal and return to it an identification of local interactive wireless devices that respond. Using that information, system server 10 can further query the user, as explained above for request processing, and attempt to identify the local restaurant best matching the user's request.

Figure 6:
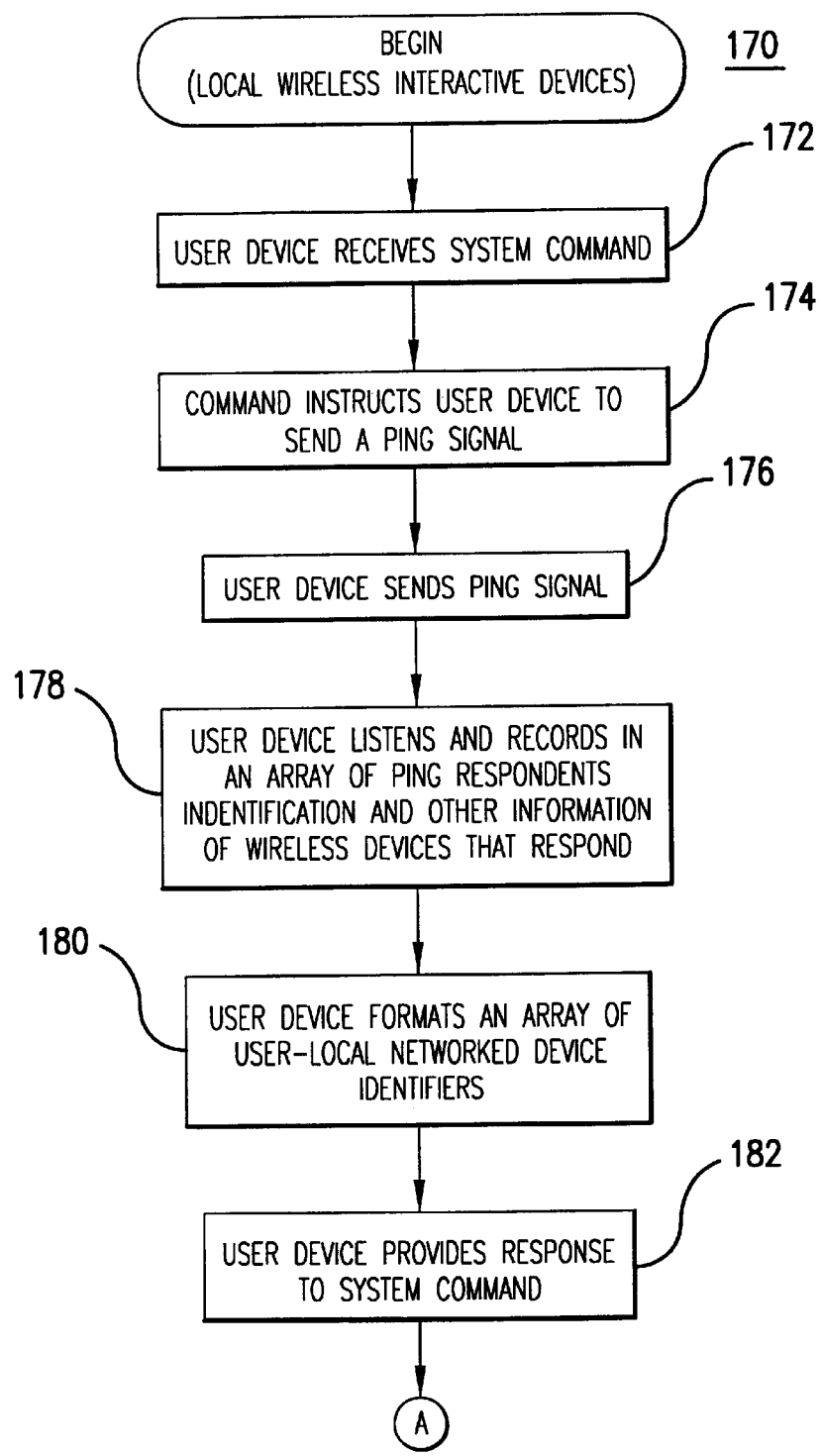
FIGS. 6 and 7 are a flow chart of a local interactive wireless devices routine.
Figure 7:
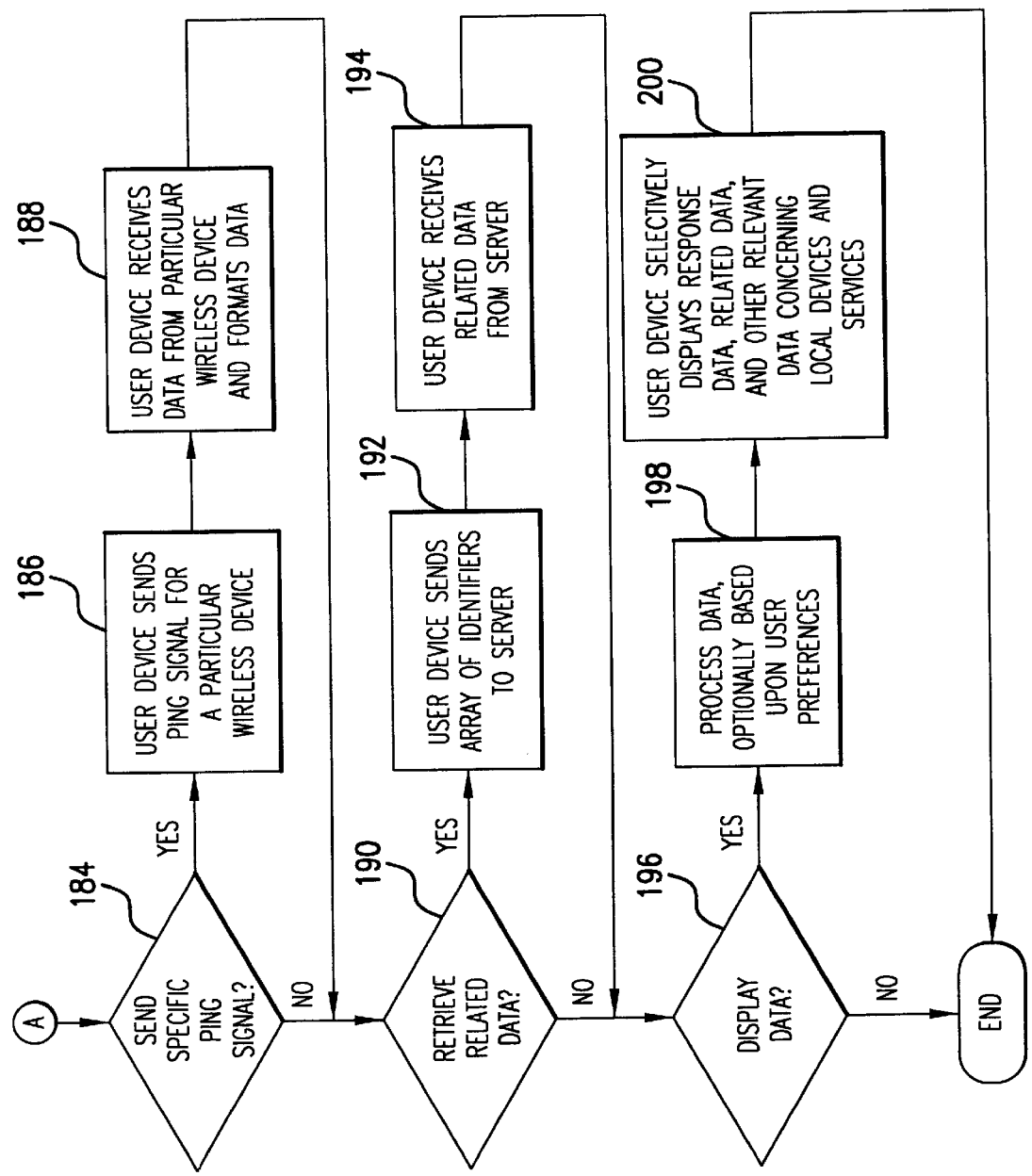

FIGS. 6 and 7 are a flow chart of a method 170 for local interactive wireless devices. Method 170 can be implemented within software modules in the user's local interactive wireless device and a server for performing the functions of the method. In method 170, the term "server" includes, for example, system server 10, and the term user device includes, for example, a device having the capability for local wireless communication as described above, consistent with the Bluetooth™ standard or other standard for local interactive wireless communication.

In method 170, a user device receives a system command (step 172), and the command instructs the user wireless device to send a ping signal (step 174). The ping signal can be configured and transmitted according to the Bluetooth™ standard or other standard for local direct wireless communication. The system command to send the ping signal can originate from a variety of sources. For example, it can be initiated by user input to the user device such as through a keyed input or spoken command. The user can thus obtain service-related information concerning local interactive wireless devices upon a manually-entered command and usually at any time. The system command can also originate from the server. For example, the server can transmit a wireless or wireline signal, such as through the networks described above, instructing the user device to transmit the ping signal and return the responses to the server. The server can then process the responses to provide information to the user, as explained below. In addition, the system command can originate from another local interactive wireless device. For example, a local interactive wireless device associated with a service provider can send a system command to the user device, when in range, instructing it to send the ping signal and transmit the responses back to the originating device for processing.

The user device transmits the ping signal within its local region (step 176). The user device subsequently listens and records in an array of ping respondents an identification and other information for the local interactive wireless devices that respond (step 178), as illustrated in Table 2.

TABLE 2

| ping signal respondents |
| --- |
| identification of respondent 1 |
| identification of respondent 2 |
| . . . |
| identification of respondent N |

The information identifying the respondents is typically a network address, which may be linked in a database with other information for the corresponding respondent. The user device can also format the array of user-local network device identifiers for subsequent processing (step 180), such as converting it for transmission over a network to the server.

The user device then provides a response to the system command (step 182), which can include a variety of responses, such as the following. The user device determines if it should send a specific ping signal (step 184); if so, the user device sends a ping signal directed to a particular local interactive wireless device (step 186), and the user device receives data from the particular local interactive wireless device and formats the data (step 188). The data can include an identification of the device or additional information such as its availability and services that it provides or are associated with it. The data can also provide context information as explained above. A specific ping signal is a ping signal transmitted and requesting information from a particular local interactive wireless device as identified in the signal, and the specific ping signal can be configured and transmitted according to the Bluetooth™ standard or other standard.

The user device determines if it should retrieve related data (step 190); if so, the user device sends the array of identifiers to the server (step 192), and it receives the related data from the server (step 194). The server, such as system server 10, can include a database in secondary storage 110 having information for the local interactive wireless devices indexed according to the device identifiers. The server can update the information using the ping signals from user's local interactive wireless devices or in other ways. For example, service providers can register with the server upon obtaining local interactive wireless capability and provide the server with its information, which can be routinely updated by the service provider.

Table 3 provides an example of a record or account for a local interactive wireless device or an associated service provider as stored in the server database.

TABLE 3

| field | data |
|---|---|
| identifier | description of device or associated service provider |
| classification | type of device or associated service provider |
| location | geographic address |
| status | status information (available, not available, other status) |
| interaction | how to interact with the device or associated service provider |
| capability | capabilities of the device or associated service provider |
| time-sensitive information | information valid for only a particular time period |
| other information | miscellaneous information |

In Table 3, the interaction can identify how one should order services from the service provider such as, for example, using phone, fax, web, or wireless communication. The term "web" refers to communication over the world wide web on the Internet. The time-sensitive information can specify, for example, special promotions or sales valid for a particular time period; it can specify both the information and a valid time period for it. The server can thus use the information shown in Table 3 for various devices in order to best fulfill a user's request using the process described above.

The user device also determines whether to display the data (step 196); if so, it processes the data for display, optionally based upon user preferences such as those described above (step 198). It selectively displays the response data, related data, and other relevant data concerning local devices and services (step 200). The data can be displayed on display device 128 for the local interactive wireless device, such as on a display panel.

Figure 8:
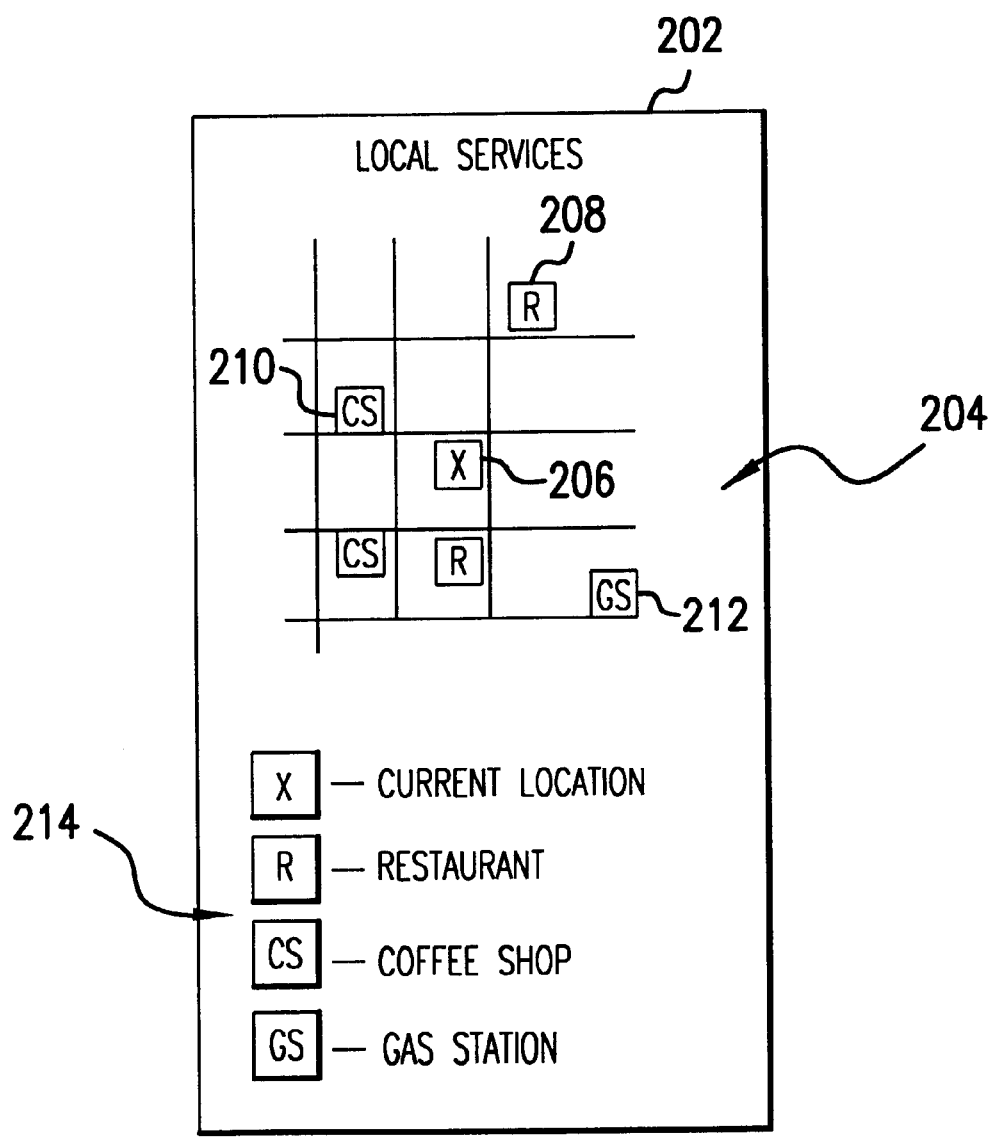
FIG. 8 is a diagram of a display on a wireless device illustrating a map of local services.

FIG. 8 is a diagram of an exemplary display 202 for presenting on the user device an indication of services available from local wireless devices or associated entities. The user wireless device can process the received data from the local wireless devices in order to present a graphic or map 204 of local services. For example, it may illustrate on a grid representing geographic streets symbols indicating available services and their location relative to a location of the user device as depicted by symbol 206. In this example, symbols 208 represent restaurants local to the user device, symbols 210 represent coffee shops local to the user device, and a symbol 212 represents a gas station local to the user device. A legend 214 can identify the meaning of the corresponding symbols.

If necessary, the user wireless device can contact the server, as described above, to obtain the information required to format the map, such as the geographic locations and classifications of the devices or associated service providers, and information for preparing a map of the user's location. Although not shown, the user's device can also, for example, identify the displayed streets and it can use various other options such as different types of symbols, different colors, or audio information in combination with the graphical information. The server can process the data for display by the user device based upon the user's preferences as described above. For example, the server can access the user's preferences in the user's account and provide an indication on the display if any of the indicated service providers are listed in the user's preferences as a favorite or otherwise comply with the preferences. Other types of displays are possible as well, such as displaying only a textual listing including one or more of the pieces of information identified in Table 3.

While the present invention has been described in connection with an exemplary embodiment, it will be understood that many modifications will be readily apparent to those skilled in the art, and this application is intended to cover any adaptations or variations thereof. For example, various types of user devices, hardware components for the devices and servers, and types of network transmissions may be used without departing from the scope of the invention. This invention should be limited only by the claims and equivalents thereof.

What is claimed is:

1. A method for obtaining services using a user wireless device, comprising:

sending a ping signal from the user wireless device;

receiving first responses to the ping signal from local interactive wireless devices within a particular range of the user wireless device, the local interactive wireless devices having associated services and the first responses comprising identification of the responding local interactive wireless devices;

assembling and forwarding the first responses to a remote server; and receiving second responses from the remote server identifying for the user wireless device the associated services of the responding local interactive wireless devices.

2. The method of claim 1, wherein the receiving of first responses include receiving network identifiers for the local interactive wireless devices.

3. The method of claim 1, further including sending a specific ping signal to one of the local interactive wireless devices.

4. The method of claim 3, further including receiving at least one of the following from the one local interactive wireless device in response to the specific ping signal: an identification of a type for the one local interactive wireless device, a geographic location of the one local interactive wireless device, an indication of how to interact with the one local interactive wireless device, a capability of the one local interactive wireless device, a status of the one local interactive wireless device, or time-sensitive information for the one local interactive wireless device.

5. The method of claim 1, wherein the receiving of second responses include receiving recommendation of services associated with the local interactive wireless devices to the user wireless device.

6. The method of claim 1, wherein the receiving of second responses include providing information to the user wireless device concerning available services associated with the local interactive wireless devices.

7. The method of claim 1, wherein the sending of the ping signal is performed in response to a user-entered command of the user wireless device.

8. The method of claim 1, wherein the sending of the ping signal is performed in response to a command received by the user wireless device from a remote server.

9. The method of claim 1, wherein the method further includes displaying on the user wireless device a graphic identifying the responding local interactive wireless devices, and providing indications of locations of the local interactive wireless devices in relation to the user wireless device.

10. An apparatus comprising:

a first wireless transmitter/receiver to send a ping signal and receive first responses to the ping signal from local interactive wireless devices within a particular range of the apparatus, the local interactive wireless devices having associated services, and the first responses include identification of the responding local interactive wireless devices;

a processor coupled to the first wireless transmitter/receiver to assemble the first responses; and a second wireless transmitter/receiver coupled to the processor to provide a remote server with the assembled first responses, and receive second responses from the remote server identifying the associated services of the responding local interactive wireless devices.

11. The apparatus of claim 10 wherein the receiving of first responses include receiving network identifiers for the responding local interactive wireless devices.

12. The apparatus of claim 10, wherein the first wireless transmitter/receiver is further used to send a specific ping signal to one of the responding local interactive wireless devices.

13. The apparatus of claim 12, the first wireless transmitter/receiver is further used to receive at least one of the following from the one local interactive wireless device in response to the specific ping signal: an identification of a type for the one local interactive wireless device, a geographic location of the one local interactive wireless device, an indication of how to interact with the one local interactive wireless device, a capability of the one local interactive wireless device, a status of the one local interactive wireless device, or time-sensitive information for the one local interactive wireless device.

14. The apparatus of claim 10, wherein the second wireless transmitter/receiver is further used to receive recommended services of the local interactive wireless devices.

15. The apparatus of claim 10, wherein the second wireless transmitter/receiver is further used to receive from the remote server available services associated with the local interactive wireless devices.

16. The apparatus of claim 10, wherein the first wireless transmitter/receiver is used to send the ping signal in response to a user-entered command of the apparatus.

17. The apparatus of claim 10, wherein the first wireless transmitter/receiver is used to send the ping signal in response to a command received by the apparatus.

18. The apparatus of claim 10, further including a display to display a graphic identifying the responding local interactive wireless devices and providing indications of locations of the responding local interactive wireless devices in relation to the apparatus.

* * * * *

UNITED STATES PATENT AND TRADEMARK OFFICE
CERTIFICATE OF CORRECTION

PATENT NO.   : 6,640,098 B1
DATED        : October 28, 2003
INVENTOR(S)  : Roundtree It is certified that error appears in the above-identified patent and that said Letters Patent is hereby corrected as shown below:

Column 1,
Line 56, "for good or services" should read -- for goods or services --

Column 2,
Line 19, "protocols exist" should read -- protocols exist --.
Line 55, "device and, the" should read -- device, and the --.

Column 3,
Line 16, "are a flow chart of" should read -- are flow charts of --.
Line 17, "wireless devices routine;" should read -- wireless device's routine; --.
Lines 27-28, "that the receives requests" should read -- that receives requests --.

Column 6,
Line 22, "services provides 80" should read -- service providers 80 --.

Signed and Sealed this

Twenty-second Day of March, 2005

JON W. DUDAS
*Director of the United States Patent and Trademark Office*